United States Patent [19]

Webber et al.

[11] 4,344,107
[45] Aug. 10, 1982

[54] SOLID TANTALUM CAPACITOR WITH CLEAN RISER

[75] Inventors: Dean A. Webber, Waterboro; Peter S. Bosse, Sanford, both of Me.

[73] Assignee: Sprague Electric Company, North Adams, Mass.

[21] Appl. No.: 143,692

[22] Filed: Apr. 25, 1980

[51] Int. Cl.³ .......................... H01G 9/00; H01G 9/05
[52] U.S. Cl. ........................................ 361/433; 29/570
[58] Field of Search .......................... 361/433; 29/570; 361/306, 311, 312, 313

[56] References Cited

U.S. PATENT DOCUMENTS

| 3,028,447 | 4/1962 | Flaschen et al. | 361/311 |
| 3,139,568 | 6/1964 | Ishikawa et al. | 361/433 |
| 3,337,429 | 8/1967 | Zind | 361/433 |
| 3,343,047 | 9/1967 | Comado et al. | 361/433 |
| 3,621,342 | 11/1971 | Yoshimura et al. | 361/433 |
| 3,679,944 | 7/1972 | Yoshimura et al. | 361/433 |
| 3,956,676 | 5/1976 | Vierow et al. | 361/433 |
| 4,203,194 | 5/1980 | McGrath | 29/570 |

OTHER PUBLICATIONS

Smyth, "Solid-State Anodic Oxidation of Tantalum," *Journal of the Electrochemical Society*, Jan. 1966, pp. 19-24.

*Primary Examiner*—James W. Davie
*Attorney, Agent, or Firm*—Connolly and Hutz

[57] ABSTRACT

The anode riser of a solid tantalum capacitor is cleaned by means of a laser beam which removes all coatings from the riser in the area of the weld between the riser and an external lead so as to leave no conducting path from the riser to the cathode.

2 Claims, 5 Drawing Figures

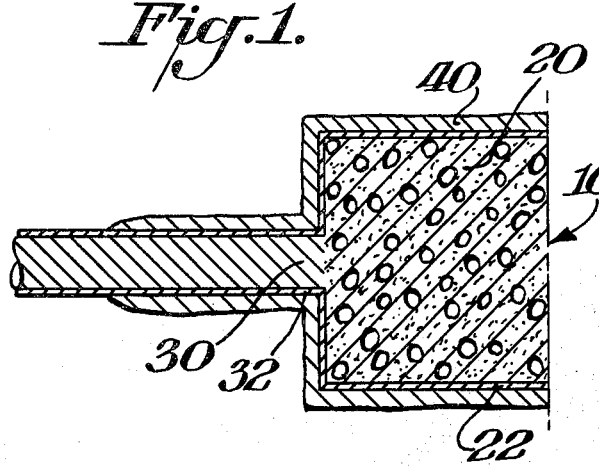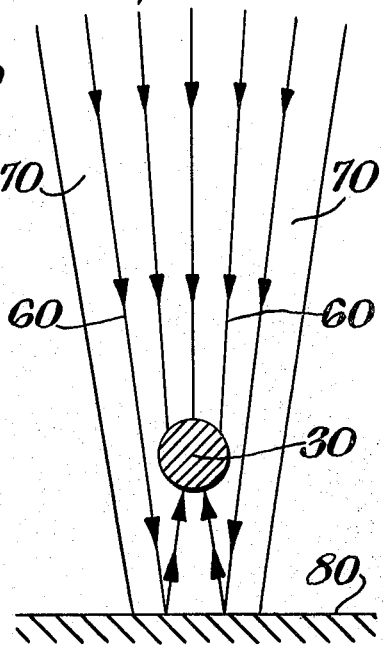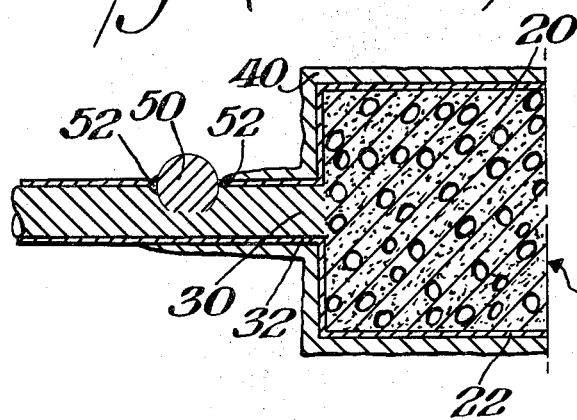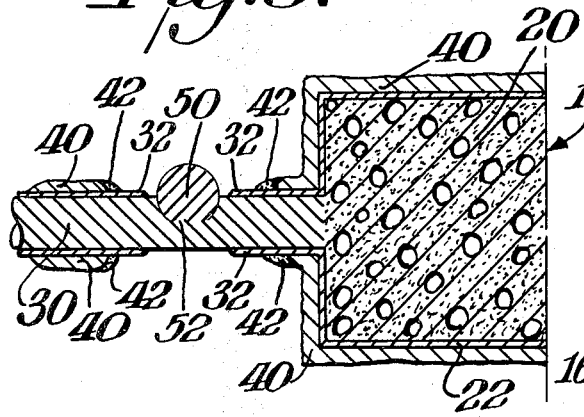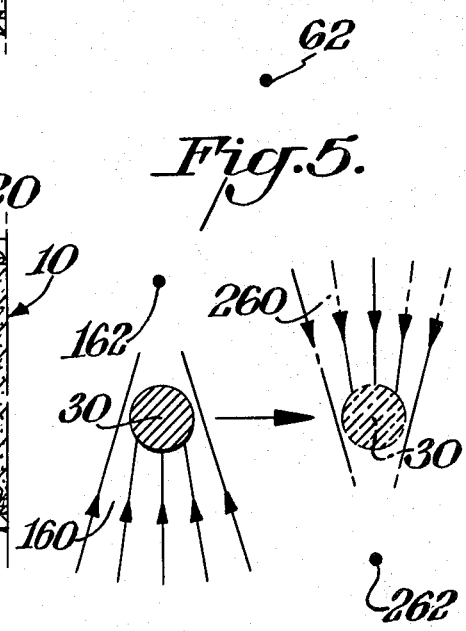

SOLID TANTALUM CAPACITOR WITH CLEAN RISER

BACKGROUND OF THE INVENTION

This invention relates to a solid tantalum capacitor with a clean riser, and more particularly to such a capacitor wherein the area around the weld between the riser and an external lead is free of unwanted conductive material, and also more particularly to a method of making such a capacitor.

Prior art solid tantalum capacitors conventionally employ an anode of tantalum, a riser of tantalum joined to the anode and extending therefrom for attachment to an external lead, and dielectric and conductive cathode layers overlying the anode. The connection between the riser and the external lead of such a capacitor must be free of the several layers that overlie the anode. However, the common commercial methods for producing solid tantalum capacitors involve batch handling and pyrolytic conversions that result in deposition of at least some part of the several cathode layers onto the riser.

Prior art welding of an external lead to the riser through the overlying layers has been difficult to accomplish, and has often resulted in leakage paths between the riser (anode) and the solid electrolyte layer (cathode). The problem has become increasingly severe with the demands for lower inductance capacitors, which demands are met by shortening the riser, as by welding the external lead to the riser closer to the anode. However, in welding closer to the anode, there is greater chance for leakage by bridging from the riser to the cathode layers.

Various methods have been employed in the prior art to avoid leakage paths between anode risers and cathode layers, generally involving some form of mechanical removal of the overlying layers, e.g. sand-blasting of the risers. These prior art methods have been costly and time consuming, have not provided a clean weld area in a significant percentage of units, and frequently even have intermingled the overlying layers to the extent of forming rather than eliminating leakage paths.

SUMMARY OF THE INVENTION

A feature of this invention is the provision of a solid tantalum capacitor having no leakage path between riser and cathode. Another feature is the provision of a metal-to-metal weld between riser and external lead wherein the weld is located close to the anode. Another feature is the provision of a process for making a solid tantalum capacitor which provides a clean weld area with no leakage path between the weld area and the cathode. Still another feature is the provision of a process which provides an improved yield of solid tantalum capacitors.

In accordance with this invention the area around the site of the weld between the riser of a solid tantalum capacitor and its external lead is cleaned by means of a laser beam.

In general, the solid tantalum capacitor of this invention employs a laser beam to clean the area of the weld between riser and external lead by vaporizing away the coatings on the riser so as to eliminate leakage paths between the riser and the cathode. The elimination of leakage paths results in an improved yield of quality capacitors. The weld close to the anode also permits the attainment of shorter packages.

BRIEF DESCRIPTION OF THE DRAWING

In a drawing which illustrates embodiments of the invention,

FIG. 1 is a cross-section of a solid tantalum capacitor prior to cleaning and welding of the riser, FIG. 2 is a cross-section of the solid tantalum capacitor of FIG. 1 after having been cleaned and welded in accordance with prior art practices, FIG. 3 is a cross-section of the solid tantalum capacitor of FIG. 1 after having been cleaned and welded in accordance with this invention, FIG. 4 is a schematic presentation of an embodiment of a laser cleaning configuration of this invention, and FIG. 5 is a schematic presentation of the preferred laser cleaning configuration of this invention.

DETAILED DESCRIPTION OF THE INVENTION

FIG. 1 shows a cross-section of a typical solid tantalum capacitor 10. A porous pellet 20 of tantalum powder has a riser wire 30 of tantalum joined to pellet 20, as by welding thereto or by being embedded therein. Riser 30 is employed during the processing and later use of the capacitor 10 as the electrical contact to anode pellet 20.

As is well known in the art, solid tantalum capacitors are produced in batches. Typical manufacture utilizes carrier bars from which a plurality of pellets are suspended by their risers. A plurality of carrier bars are spaced apart in racks for mass handling during the several steps in the processing of the conventional dielectric and conductive cathode layers on the pellets. A typical process is described by Bernard in U.S. Pat. No. 3,843,492 issued Oct. 22, 1974.

Dielectric oxides 22 and 32 ($Ta_2O_5$) are formed on pellet 20 and riser 30, respectively, as by anodization. Solid electrolyte 40 ($MnO_2$) is formed over oxides 22 and 32, as by deposition of a precursor ($Mn(NO_3)_2$) and pyrolytic conversion to the peroxide. The violence of the production of the solid electrolyte requires that the oxide 32 extend outwardly along riser 30 so as to ensure that the solid electrolyte 40 which forms up the riser 30 does not contact the bare tantalum surface of the riser. However, the inductance requirements for solid tantalum capacitors demand that riser 30 be joined to any external lead close to the pellet. Hence, coatings 32 and 40 must be removed from riser 30 in the area of the weld in order to ensure an ohmic contact to the external lead and the elimination of leakage paths from coating 40 to riser 30.

FIG. 2 shows a typical prior art weld between riser 30 and an external lead 50. Bare metal to bare metal contact has been established between the riser and the lead, as is the case with the better prior art welding methods. However, leakage paths 52 have been left whereby part of solid electrolyte layer 40 has been left to bridge dielectric 32 and provide a low resistance contact riser 30.

FIG. 3 shows the weld between riser 30 and external lead 50 that is achieved by this invention. The solid electrolyte layer 40 has been removed over a greater area than the area of removal of dielectric layer 32, thereby substantially reducing the likelihood of leakage paths between riser weld and the solid electrolyte cathode. In addition, the fringe 42 of solid electrolyte 40 around the area of removal has been reduced to a lower oxide of manganese which is insulating or very low conductivity material ($MnO_x$ probably $Mn_2O_3$). This reduction of $MnO_2$ has been described in the tantalum capacitor literature by Smyth in J. Electrochem. Soc. 113, pp 19–24 (Jan. 1966).

Removal of a greater area of layer 40 than layer 32 establishes a greatly extended path over which any leakage between anode and cathode potentials in the capacitor 10 would have to occur. Conversion of the fringe 42 of layer 40 around the removal area into a non-conducting species further eliminates the changes of a leakage path being established between anode and cathode potentials in the capacitor.

Cleaning of riser 30 in accordance with this invention so as to produce the structure shown in FIG. 3 is accomplished by directing a laser beam onto the riser. There are a number of variables within the scope of this invention, including the strength of the beam and the duration of contact of the beam on the riser. The number of laser beams directed at the riser, relative movement between the laser and the riser, and the welding of the riser to an external lead are all elective without departing from the concept of this invention.

FIG. 4 shows diagrammatically one method of laser removal of selected areas of the overlying layers 40 and 32 from riser 30. A single laser beam 60 is directed at a stationary riser 30 with a coaxial air stream 70 surrounding the beam 60. A reflecting surface 80 is provided to direct beam 60 back onto riser 30, and thereby ensure cleaning of a band completely around riser 30. Beam 60 has a long focal length (approx. 5 inches) and is focussed at a point 62 beyond reflecting surface 80 to facilitate the reflective cleaning of the underside of riser 30.

The laser beam 60 cleans the top of riser 30 when it first strikes it. The coaxial air 70 carries the heat of the beam partially around the riser cleaning the sides, and the reflection from the "mirror" 80 underneath the riser comes back and clean the bottom of the riser.

FIG. 5 shows diagrammatically the preferred embodiment of this invention wherein a pair of laser beams 160 and 260 are directed onto opposite surfaces of riser 30 as the riser passes at a continuous and constant motion through the beams. It has been found that the use of multiple beams permits the elimination of the concentric air flow which was found to be desirable for a single laser beam. Focusing of the beams at 162 and 262 beyond the riser target is utilized to ensure removal of all coatings from completely around the riser, without need of using mirrors between the focuses and the riser 30. Although reflective mirrors are usable in this embodiment, it is preferred not to use mirrors because mirrors in this equipment configuration become dirty rather quickly and require frequent stopping of the equipment in order to clean the mirror.

In the preferred embodiment of FIG. 5 the laser beams 160 and 260 are operated continuously, and a succession of risers (capacitor bodies) are passed through beams at a continuous and constant rate by conventional transport means. It has been found that $CO_2$ laser beams of 150 watts strength permit the passage of the risers at a constant feed rate of three inches per second.

Laser beams 160 and 260 are shown as being directed perpendicular to the line of passage of risers 30 through the beams. Directing the beams at an angle to the risers permits additional control over the beam coverage of the riser. Passing the risers through the beams at about 0.4 inch (10 mm) from the focal point of beams having focal lengths of 5 inches (127 mm) has been found to clean about 45 mils (1.15 mm) of $MnO_2$ and about 30 mils (0.76 mm) of $Ta_2O_5$ from the risers, and to produce about 5 mils (0.13 mm) of fringe of converted $MnO_x$.

Although the preferred embodiment of this invention has been described in terms of a $CO_2$ laser, it is within the scope of this invention to utilize a glass laser, a YAG laser, or other continuous beam laser. Simplicity of continuous production equipment makes a continuous beam laser preferred over a pulsed system. The use of plasma arc equipment to obtain riser cleaning is an alternative to the laser cleaning of this invention, but is not considered to be as efficient as the laser beam cleaning embodiments of this invention.

In a like manner, it is preferred for the risers to pass through the laser beams in a continuous motion. However, it will be recognized by those skilled in production equipment that the risers may be stepped or indexed under the beams.

External lead 50 is shown in FIG. 3 as being joined to riser 30 in a weld 52 which is substantially midway in the cleaned portion of the riser, so as to ensure maximum separation from the $MnO_2$ surface. Weld 52 is preferably made by use of a conventional resistance welder, inasmuch as resistance welding is both fast and reproducible. However, weld 52 may be accomplished by the same laser beam that is used to clean riser 30, or by a third laser beam in the continuous motion embodiment of FIG. 5.

The known use of polytetrafluoroethylene and/or other organic coatings on the riser in order to control the extent of wetting during the production of the solid electrolyte may be eliminated by employing the laser cleaning method of this invention. However, the laser beam method as described herein has been found to remove all organics that may be present on the riser.

What is claimed is:

1. A solid tantalum capacitor having a tantalum anode with a riser extending therefrom, an external lead welded to said riser, a dielectric layer on said anode and said riser, and a manganese dioxide solid electrolyte layer on said dielectric layer, wherein the improvement comprises the weld between said riser and said lead being bare metal to bare metal, an area of said riser at the site of said weld being free of said dielectric layer and said solid electrolyte layer, and the solid electrolyte layer adjacent said area being a low conductivity manganese oxide.

2. The solid tantalum capacitor of claim 1 wherein said free area extends completely around said riser.

* * * * *